INVENTOR
JOSEPH C. HURLBURT
BY Walter V. Wright
AGENT

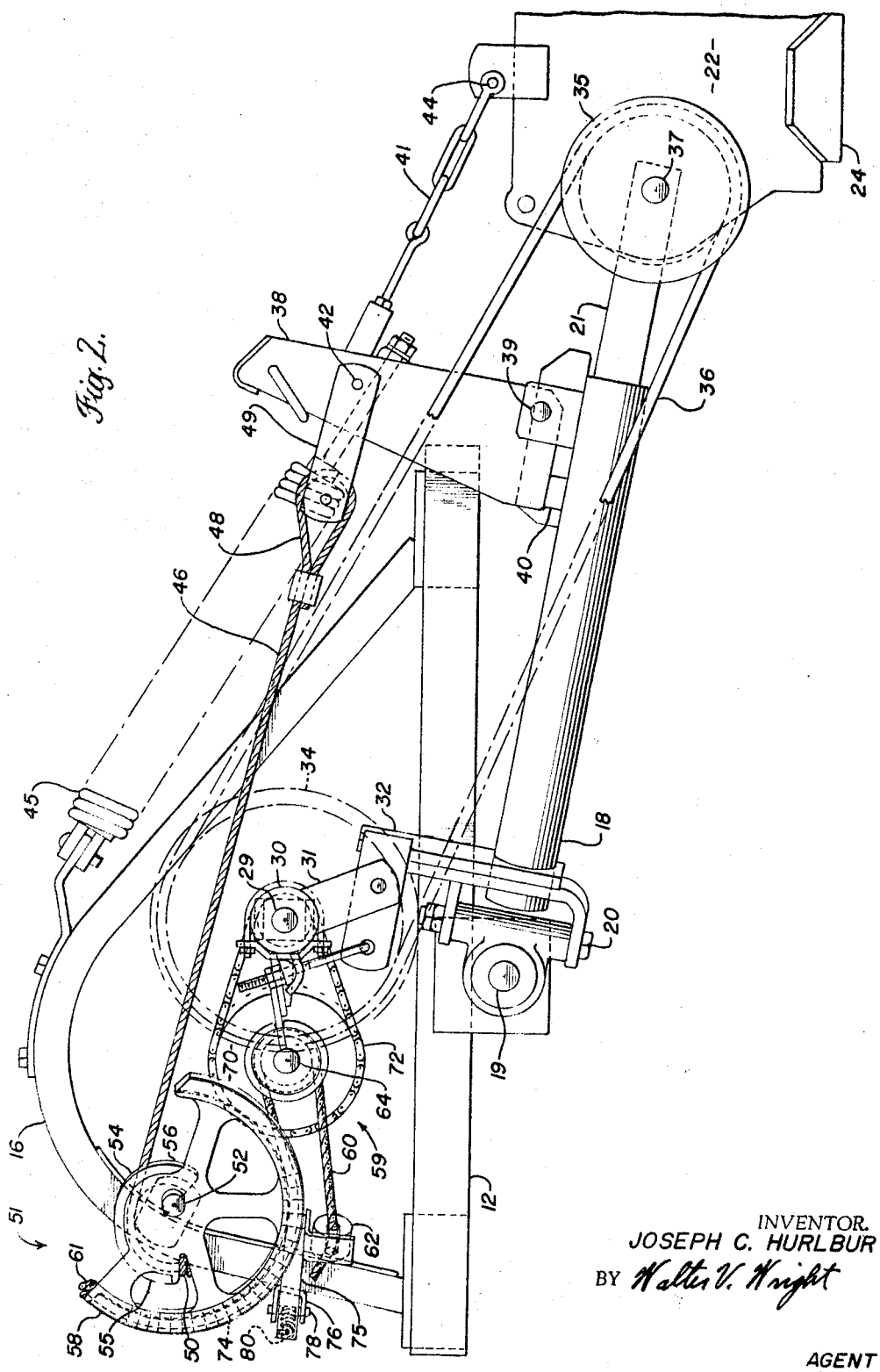

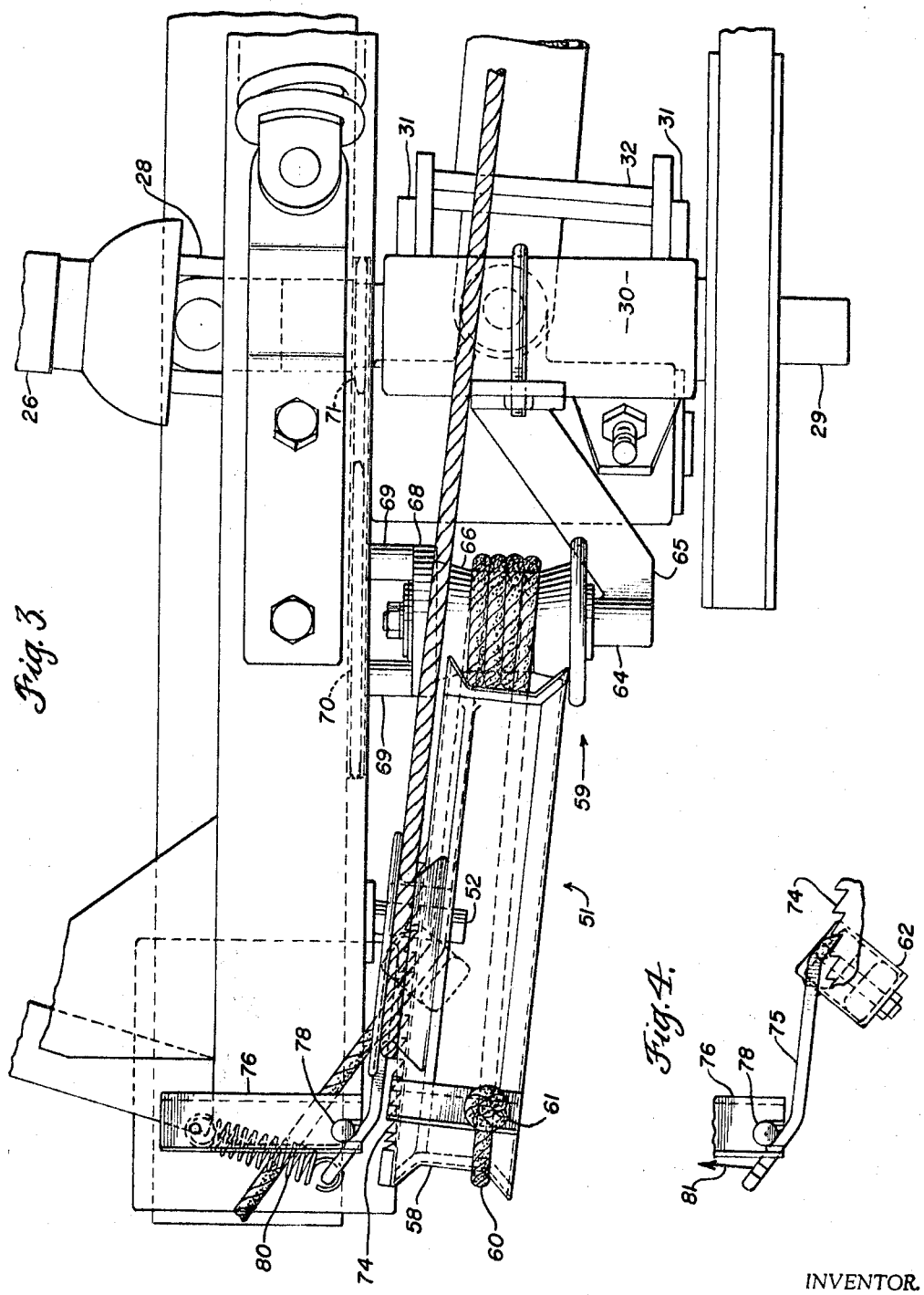

United States Patent Office
3,449,893
Patented June 17, 1969

3,449,893
MECHANICAL CUTTERBAR LIFT
Joseph C. Hurlburt, Leola, Pa., assignor to Sperry Rand Corporation, New Holland, Pa., a corporation of Delaware
Filed Feb. 3, 1967, Ser. No. 613,850
Int. Cl. A01d 55/28
U.S. Cl. 56—25                                10 Claims

ABSTRACT OF THE DISCLOSURE

An apparatus for lifting a mower cutterbar utilizing a winch which is driven by a rope enwrapped about a constantly driven capstan. The operator of the mower controls the application of driving power to the winch by controlling the tightness of rope wrap around the capstan.

Background of the invention

Substantially all agricultural mowers have cutterbars mounted for movement between a lowered operative position and a raised inoperative position. On early mowers, the cutterbar could be raised manually by a lever, but as cutterbars increased in size and weight, it became increasingly difficult to accomplish the cutterbar elevating manually. The advent of pitmanless mowers, wherein the weight of the mower driving head is added to the cutterbar, has clearly rendered it impractical to employ manual cutterbar lift mechanism.

Hydraulic cylinders generally supply the motive force to lift the cutterbars of current agricultural mowers, while the power take-off shaft of the tractor is employed to power the moving cutting elements of the mower. While virtually all tractors are provided with power take-off shafts, some tractors are not equipped to operate a remote hydraulic cylinder. On other tractors, a hydraulic system is available only at considerable extra cost. It is common practice today to trail a hay conditioning implement behind a mower. Many hay conditioning implements utilize a hydraulic cylinder. Consequently, even though a tractor is equipped to operate a remote hydraulic cylinder, that capacity may not be available for use in controlling the position of the mower cutterbar if it is required to control another simultaneously employed implement. Thus, there is a need for mechanism other than manual and hydraulic to effect raising and lowering of mower cutterbars.

While mechanical cutterbar lifts driven from the tractor power take-off mechanism have been devised in the past, they have generally not been comparable to hydraulic lift systems in such areas as ease and exactness of cutterbar control, compactness of size, smoothness of operation, and reduction or elimination of high stress concentration areas in the mechanism. Some of the devices have been heavy and cumbersome, while others have been complex and expensive.

A particular shortcoming in prior mechanical lifts has been an inability to readily elevate the cutter bar to an intermediate position between the extreme upper or lower positions and hold the intermediate position for an indefinite period of time. It is desirable that a mechanical cutterbar lift system have operating characteristics similar to a hydraulic system in order that a basic mower mechanism may be selectively provided with either lift system with minimum modification of the basic structure.

Summary of the invention

The present invention provides an economical, mechanically simple cutterbar lift mechanism for agricultural mowers. Its cutterbar raising action is similar to that of a hydraulically powered lift mechanism for the same mower whereby interchangeability between the mechanical and hydraulic lift systems may be accomplished with minimum modification to the basic mower implement structure. The mechanism of the present invention is of compact size. It employs a cable and winch device whose mechanical advantage varies during operation to afford optimum smoothness of operation, uniform light loading of the tractor power take-off mechanism and positive and fast cutterbar elevating action. Little effort or concentration is required on the part of the tractor operator to exercise precise control over the cutterbar lifting mechanism of the present invention. The operator may readily stop and indefinitely hold the cutterbar in any position between the upper and lower limit positions.

Brief description of the drawings

FIG. 2 is a rear elevational view of the mechanism of FIG. 1 to an enlarged scale;

FIG. 3 is a fragmentary plan view of the cutterbar lift mechanism shown in FIG. 2 to an enlarged scale; and FIG. 4 is a detail view of the winch latch device.

Description of the preferred embodiment

Figure 1:
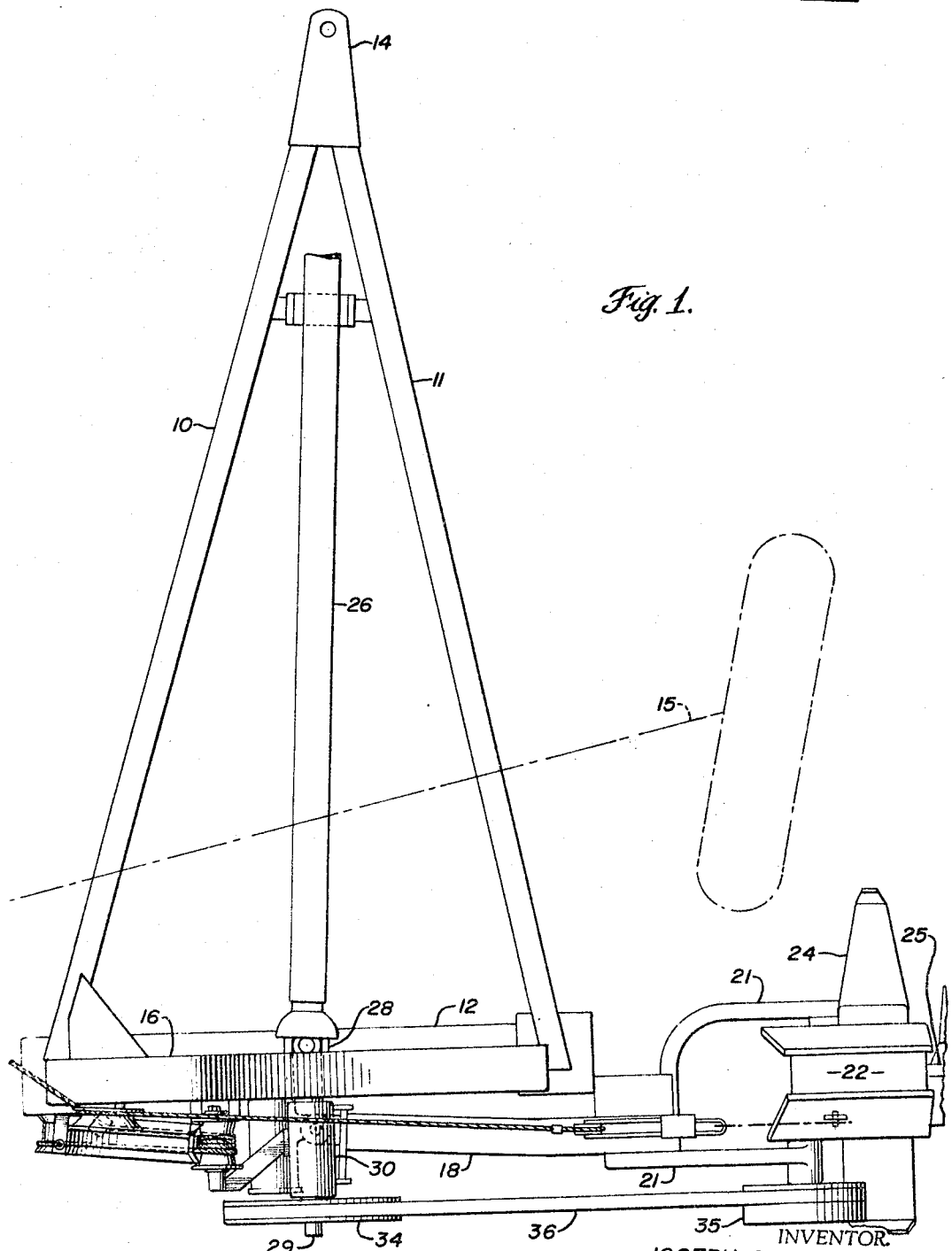
FIG. 1 is a fragmentary general plan view of a mower provided with a mechanical cutter bar lift mechanism constructed in accordance with the principles of the present invention.

FIG. 1 shows a typical mower base frame structure having forwardly tapering side frame rails 10 and 11 interconnected at the rear by a cross frame beam 12 and provided at the front end with a tractor hitch clevis 14. Such a base frame unit is usually mounted on a wheel and axle assembly on the order of that indicated by the phantom line 15 in FIG. 1. The base frame is completed by an inverted U-shaped arch member 16 overlying cross frame member 12.

Referring to FIG. 2, a mower drag bar 18 has an inboard end journalled on a pintle 19 which projects rearwardly from base frame member 12. The drag bar may also be mounted for rearward swinging movement about a substantially vertical pivot member 20 to provide the customary mower breakaway action well known in the mower art. Drag bar 18 has a bifurcated outboard end 21 which pivotally supports the customary mower driving head 22. A shoe 24 is provided on the underside of driving head 22 and rides along the ground when the mower is in operation. As may be seen in FIG. 1, the usual mower cutterbar 25 extends outwardly from ground shoe 24 and driving head 22.

Driving power for the reciprocating sickle elements of cutterbar 25 is transmitted from the power take-off mechanism of a tractor towing the mower by a power take-off extension shaft 26 (FIG. 1) whose forward end is connected to the usual power take-off shaft of the tractor. Shaft 26 extends rearwardly from the tractor to the frame arch 16 where it is coupled, as indicated at 28, to a short shaft 29. The shaft 29 is carried in a journal box 30 which is supported, as seen in FIG. 2, by arms 31 affixed to the inboard end of drag bar 18 by stanchion plates 32. A drive pulley 34 (FIG. 1) is keyed to the short shaft 29 and drives the mower driving head flywheel 35 by a V-belt 36.

In FIG. 2, an upstanding member 38, known as a mower gag post, may be seen rising upwardly from drag bar 18 adjacent the bifurcated outboard end of the drag bar. Gag post 38 is pivotally mounted at 39 to the upper side of the drag bar 18. The gag post 38 is free to rock about pivot 39 a few degrees in the clockwise direction from the position shown in FIG. 2. A stop member 40 is affixed to the bottom of gag post 39 in position to engage drag bar 18 and limit counterclockwise movement of gag post 38 to the position shown in FIG. 2. A short chain 41 is interconnected between a pivot member 42 on the gag post and a pivot member 44 on the mower driving head. A large flotation spring 45 is interconnected between the gag post 38 and the upper portion of base frame arch 16. The mower driving head 22, and the cutterbar 25 carried thereby, is pivotally mounted in the bifurcated end 21 of drag bar 18. A pivot axis of the mower driving head coincides with the axis of shaft 37 of the driving head flywheel 35. The weight of the mower cutterbar and driving head acts through short chain 41 to urge gag post 38 in the clockwise direction about its pivotal mounting point 39. The flotation spring 45 urges gag post 38 in the counterclockwise direction about its pivotal mounting point 39. The flotation spring 45 counterbalances a considerable portion of the weight of the entire drag bar and cutterbar assembly. In operation, the drag bar and cutterbar are counterbalanced about pintle 19 by spring 45 so that the inner ground shoe 24 under the mower driving head floats along the ground. The outer end of cutterbar 25 also floats along the ground due to the counterbalancing of the cutterbar about pivot axis 39 of gag post 38 by the same single flotation spring 45. During normal operation, the stop member 40 on the bottom of gag post 38 is not in engagement with drag bar 18.

In the design of mowers, it is customary to have the lift linkage raise the outer end of the cutterbar ahead of the inner, or driving head, end. Thus, referring to FIG. 2, the initial lifting action upon raising of the mower cutterbar would be to pivot the cutterbar and driving head 22 counterclockwise about the pivot axis 37 to raise the outer end of the cutterbar. The extent of this pivotal action is limited by the stop 40 engaging the upper surface of drag bar 18 as shown in FIG. 2. Following this, further raising action causes the entire drag bar and cutter bar to swing upwardly about its mounting pintle 19.

The cutterbar lifting force is applied to gag post 38 by a lifting cable 46 having one end 48 looped through a bracket 49 which is anchored to the pivot member 42 on the gag post. The other end 50 of cable 46 is anchored to a winch-like device 51 having a central shaft or axis of rotation 52. The short shaft 52 of winch 51 is mounted on arch member 16 of the mower base frame. As may be seen in FIGS. 2 and 3, cable 46 wraps around an outer surface 54 of the winch member 51. The surface 54 has a V-groove configuration much like a V-belt pulley. It will be apparent in FIG. 2 that surface 54 is disposed eccentrically relative to the central shaft 52 of the winch. One end portion 55 of surface 54 has a greater radius, or moment arm, about shaft 52 than the other end portion 56. When wrapping lift cable 46, the mechanical advantage of surface 54 increases from end 55 to end 56. It is also apparent in FIG. 2 that surface 54 does not extend completely around central shaft 52.

Winch 51 has a second outer surface 58 which is concentric to the winch central shaft 52 and has a considerably larger radius of curvature than the first, or cable re-receiving, surface 54. The second outer surface 58 is also of V-groove configuration as may be seen in FIG. 3. A rope 60 has one end 61 anchored to one end of the outer surface 58. Rope 60 is entrained about the arcuate surface 58 and extends from surface 58 to a capstan, generally indicated by the reference numeral 59. Rope 60 is enwrapped about capstan 59 for several turns and extends therefrom to an eyelet 62 which will be more fully described hereafter. From eyelet 62, the rope 60 extends forwardly to the operator's station of a tractor or the like coupled to hitch 14 at the front end of the mower.

Referring again to capstan 59, it has a central pilot shaft 64 supported from the mower drive pulley journal box 30 by a bracket 65 (see FIG. 3). The concave capstan drum 66 is journalled on pilot shaft 64. The end flange 68 at the forward end of the capstan drum, has fixed thereto a plurality of blocks 69 which are fixedly attached to, and carry, a relatively large diameter sprocket 70. A small diameter sprocket 71 is fixed relative to the mower drive shaft 29 just in front of drive pulley journal box 30 and at the rear of the universal coupling 28 which connects shaft 29 to the power takeoff extension shaft 26. A roller chain 72 (FIG. 2) drives sprocket 70 from sprocket 71 on the mower drive shaft, thereby driving capstan drum 66 about its pilot shaft 64.

A series of ratchet teeth 74 are formed on a forward face of the rope receiving portion having surface 58 of the winch (see FIG. 4). The previously mentioned eyelet 62 is carried by a locking pawl 75. Pawl 75 is pivotally mounted on a bracket 76 by a pin 78. The bracket 76 is fixedly attached to arch-like frame member 16 of the mower base frame. Pawl 75 extends beyond the pivot pin 78 in the direction opposite the ratchet teeth 74 and has connected thereto a biasing spring 80 (see FIG. 3). The biasing force of spring 80 acts in the direction of the arrow 81 in FIG. 4 to spring load the pawl 75 into engagement with the ratchet teeth 74 on the forward face of rope receiving portion 58 of the winch.

When the mower is in operation, the capstan drum 66 is continuously driven by the sprockets 70 and 71 and endless chain 72. When rope 60 is tightly wrapped on capstan drum 66, the capstan drives, or feeds, the rope. When the rope 60 is loosely wrapped on capstan drum 66, it slips relatively thereto and is not driven, or fed, by the capstan drum. When the operator desires to elevate the mower cutterbar and drag bar, he exerts tension on the end of rope 60 that extends to the operator's station of the tractor. This pulls the rope tightly on capstan drum 66 causing the rope to feed toward the tractor operator. Since the other end 61 of rope 60 is enwrapped on winch outer surface 58 and anchored thereto, the rope 60 drives the winch in the counterclockwise direction about its central shaft 52 (FIG. 2). To maintain the winch driving condition, the operator need only exert enough tension on ropes 60 to take up the slack rope that is fed toward him by the capstan. Only aproximately one-half of a revolution of winch 51 is required to elevate the mower cutterbar from its lowermost operative position to its uppermost inoperative position. When the desired cutterbar elevation is achieved, the operator relaxes his control tension on the rope 60 and the capstan ceases to drive winch 51. By varying his control tension on the rope to regulate slippage betwen the rope and capstan, the operator may allow the mower cutterbar and drag bar to slowly and gradually lower, or he may drop the drag bar quickly to the ground.

The extension of rope 60 through eyelet 62 on latch pawl 75 enables the operator to control engagement and disengagement of the latch pawl with ratchet teeth 74 at the same time he regulates the driving action of the capstan 66. As soon as the operator exerts tension on rope 60, the rope 60 acting through eyelet 62 disengages pawl 75 from the locking teeth 74 on the winch. The rope 60 will slip on capstan drum 66 when under greater tension than that required to disengage locking pawl 75. Thus, if the operator desires to lower the mower, he merely maintains sufficient tension on the rope to hold pawl 75 out of engagement with the ratchet teeth while still allowing the rope 60 to slip on capstan drum 66. If the operator wishes to latch the mower in a desired elevated position, he merely quickly releases all tension on the rope 60 thereby allowing locking pawl 75 to snap into engagement with teeth 75 under the influence of biasing spring 80. The pawl 75 then mechanically locks winch 51 fixed relative to the mower base frame.

It will be obvious from FIG. 2 that as winch 51 is driven by rope 60, it exerts pull on cutterbar elevating cable 46 as the cable wraps on the smaller surface portion 54 of the winch. As previously mentioned, during normal operation the mower cutterbar is balanced by flotation spring 45. The cable 46 therefore normally hangs slack as the mower operates in order not to interfere with flotation of the mower along the ground. In FIG. 2, the winch has rotated approximately ninety degrees from its normal position and the slack has already been removed from cable 46 in preparation for elevating the mower. The eccentric surface 54, upon initial rotation of winch 51, first wraps cable 46 about the large radius end 55 of surface 54. This quickly takes up any slack in the cable 46. As the mower elevates and flotation springs 45 grows slack, the cable 46 is progressively wound about a reduced radius portion of the cable wrapping surface 54 thereby progressively increasing the mechanical advantage of the winch. Thus, the control tension that the operator must exert on rope 60 remains substantially uniform and gaugable by "feel" regardless of the position of the mower cutterbar.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a mowing implement for a tractor or the like having power takeoff means, a frame connectable behind said tractor, a cutterbar, means mounting said cutterbar on said frame for movement relative thereto between a lowered operative position and a raised inoperative position, and means for selectively raising and lowering said cutterbar between said positions, the improvement residing in said means for selectively raising and lowering said cutterbar and comprising: a capstan journalled on said frame, means connecting said capstan in driven relation to said tractor power take-off means, a winch journalled on said frame, means operatively interconnecting said winch and said cutterbar to raise the cutterbar upon rotation of said winch, a flexible member having first and second ends and having an intermediate portion wrapped around said capstan to be driven thereby when tightly wrapped and to slip relative thereto when loosely wrapped, means connecting said first end of said flexible member in driving relation to said winch, and said second end of said flexible member extending from said capstan to the operator of the tractor for selective manual control of the tightness of the wrap about said capstan to control the operation of said winch.

2. The mowing implement improvement recited in claim 1 wherein said means operatively interconnected between said winch and said cutterbar to raise said cutterbar upon rotation of said winch comprises a cable having one end anchored to said winch, means operatively connecting the other end of said cable to said cutterbar, said winch having a predetermined axis of rotation and an outer surface about which a portion of said cable is entrained, said outer surface being eccentric to said axis of rotation whereby the mechanical advantage of said winch varies during the course of a single rotation.

3. A mowing implement improvement as recited in claim 1 including means for latching said winch to hold said cutterbar in any selected position between said operative and inoperative positions, and control means engaging said flexible member between said capstan and said tractor operator for operating said latch means in response to variations in the tension of said flexible member.

4. A mowing implement improvement as recited in claim 3 wherein said latch means comprises a series of teeth formed on said winch and a locking pawl pivotally mounted on said frame in position to engage said teeth, and wherein said control means comprises a spring interconnected between said pawl and said frame and biasing said pawl into engagement with said teeth and and eyelet on said pawl through which said flexible member passes in extending from said capstan to said tractor operator, said eyelet and said spring respectively engaging said pawl at points so relatively located that increased tension in said flexible member urges said pawl out of engagement with said teeth in opposition to said spring.

5. The mowing implement improvement recited in claim 1 wherein said winch is journalled on said frame for rotation about a predetermined fixed axis, said means interconnecting said winch and said cutterbar to raise the cutterbar upon rotation of said winch comprises a cable, said winch having a first outer surface about which said cable is wrapped upon rotation of said winch, said first outer surface being disposed eccentrically relative to said axis and having a portion of maximum radius which initially engages said cable upon rotation of said winch, the radius of said eccentric first outer surface progressively decreasing from said portion of maximum radius to a portion of minimum radius relative to the direction of wrap of said cable.

6. The mowing implement improvement recited in claim 5 wherein said winch has a second outer surface concentric to said axis of rotation and of greater radius than the maximum radius of said first eccentric outer surface, said flexible member being entrained around said second outer surface when said cutterbar is in said operative position, said first end of said flexible member being anchored to said winch adjacent one end of said second outer surface.

7. The mowing implement improvement recited in claim 6 wherein said first and second outer surfaces of said winch, said cable, and said flexible member are so relatively disposed that rotation of said winch in one direction is accompanied by wrapping of said cable onto said first outer surface and unwrapping of said flexible member from said second outer surface, said winch being driven by the unwrapping of said flexible member from said second outer surface.

8. The mowing implement improvement recited in claim 7 wherein a pawl and ratchet latch holds said winch in any selected position, said pawl being pivotally mounted on said frame adjacent said second outer surface, said ratchet comprising an arcuate series of teeth formed on said winch adjacent said second outer surface.

9. In a mowing implement for a tractor or the like having power takeoff means, a frame connectable behind said tractor, a cutterbar, means mounting said cutterbar on said frame for movement relative thereto between a lowered operative position and a raised inoperative position, and means for selectively raising and lowering said cutterbar between said positions, the improvement residing in said means for selectively raising and lowering said cutterbar and comprising: a capstan journalled on said frame, means connecting said capstan in driven relation to said tractor power take-off means, a winch journalled on said frame for rotation about a predetermined axis, a cable interconnected between said winch and said cutterbar to raise said cutterbar from said operative position to said inoperative position in response to rotation of said winch through less than one complete revolution in one direction about said axis, said cable being slack between said winch and said cutterbar when the cutterbar is in said lowered operative position, said winch having an eccentric outer surface of decreasing radius relative to said axis and about which said cable wraps upon rotation of said winch in said one direction whereby said cable slack is taken up by the initial wrapping of said cable on the portion of said eccentric outer surface having maximum radius followed by raising of said cutterbar by the wrapping of said cable on the decreased radius portion of said eccentric outer surface, a flexible member having first and second ends and having an intermediate portion wrapped about said capstan to be driven thereby when tightly wrapped and to slip relative thereto when loosely wrapped, means connecting said first end of said flexible member to said winch to drive the winch in said one direction when said flexible member is driven by said capstan, said second end of said flexible member extending from said capstan to the operator of the tractor for selective manual control of the tightness of the wrap about said capstan to control the operation of said winch.

10. The mowing implement improvement recited in claim 9 including a latch mounted on said frame and engageable with said winch to lock said winch in any selected position for holding said cutterbar in any selected position between said operative and inoperative positions, and means controlling engagement of said latch with said winch in response to the tension of said flexible member.

References Cited

UNITED STATES PATENTS

| | | | |
|---|---|---|---|
| 1,973,993 | 9/1934 | Pearson | 56—25 |
| 2,249,633 | 7/1941 | MacDonald et al. | 56—25 |
| 2,617,242 | 11/1952 | Iverson | 56—25 |
| 2,826,029 | 3/1958 | West | 56—25 |
| 2,984,960 | 5/1961 | Wathen et al. | 56—25 |

RUSSELL R. KINSEY, *Primary Examiner.*